Figure 1:
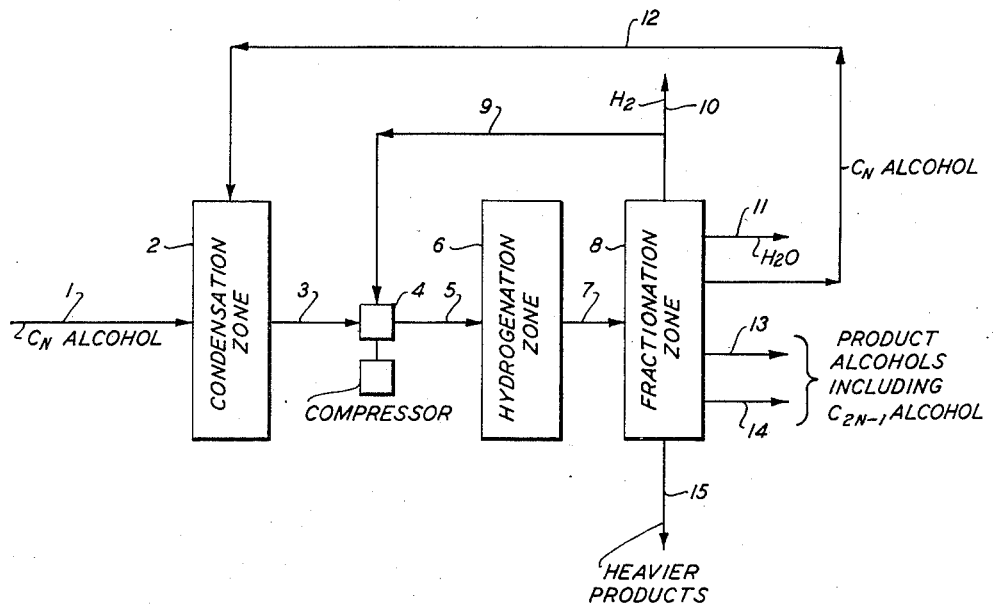

July 14, 1953

E. E. BURGOYNE 2,645,667

CONDENSATION OF ALCOHOLS IN THE
PRESENCE OF CALCIUM HYDROXIDE
Filed Oct. 1, 1951

INVENTOR.
E. E. Burgoyne
BY
Hudson & Young
ATTORNEYS

Patented July 14, 1953

2,645,667

UNITED STATES PATENT OFFICE 2,645,667

CONDENSATION OF ALCOHOLS IN THE PRESENCE OF CALCIUM HYDROXIDE

Edward E. Burgoyne, Bartlesville, Okla., assignor to Phillips Petroleum Company, a corporation of Delaware Application October 1, 1951, Serial No. 249,092

17 Claims. (Cl. 260—618)

This invention relates to the condensation of a lower molecular weight alcohol to form a higher molecular weight alcohol. In one aspect, it relates to the condensation of a lower molecular weight alcohol to form a higher molecular weight alcohol in which the number of carbon atoms is a nonintegral multiple of that in the original alcohol. In another aspect, it relates to the condensation of an alcohol containing at least two carbon atoms per molecule to form an alcohol containing one less than twice the number of carbon atoms per molecule of the original alcohol. In still another aspect, it relates to the intercondensation of a primary straight-chain alkanol with a branched-chain alkanol. In a further aspect, it relates to the intercondensation of a primary straight-chain alkanol with an aromatic alcohol. In still another aspect, the invention relates to conducting the above-mentioned condensations in the presence of certain contact materials and under certain conditions of temperature and pressure.

This application is a continuation-in-part of copending application Serial Number 133,037 filed December 15, 1949, now abandoned.

According to this invention, a low-boiling primary straight-chain alkanol is condensed in the presence of a contact material comprising calcium hydroxide to obtain a higher-boiling alcohol in which the number of carbon atoms per molecule is a nonintegral multiple of that in the original alcohol. In one embodiment of this invention, two moles of a normal 1-alkanol condense to form a higher-boiling alkanol in which the number of carbon atoms is a nonintegral multiple of that in the original 1-alkanol. In another embodiment, two different normal 1-alkanols intercondense to form a higher-boiling alkanol. In another embodiment, a normal 1-alkanol intercondenses with a branched-chain alkanol to form a higher-boiling alkanol. In still another embodiment, a normal 1-alkanol intercondenses with an aromatic alcohol to form an aryl-substituted alkanol. In a preferred embodiment, the calcium hydroxide is promoted with a minor proportion of at least one of an alkali-metal hydroxide, silica, and magnesia. In another preferred embodiment the contact material is a mixture of calcium hydroxide, preferably soda-lime, and copper oxide-chromium oxide (copper-chromite). The condensations of this invention are conducted at a temperature in the range of 375° to 580° C. when calcium hydroxide or soda-lime is used as the contact material and at temperatures of 300° to 580° C. when a mixture of soda-lime and copper oxide-chromium oxide is used.

In the prior art, low-boiling alcohols have been chemically condensed in the presence of alkaline catalysts, but the products obtained are alcohols containing an integral multiple of the number of carbon atoms of the original alcohol. For example, ethanol has been condensed to obtain butanol, propanol has been condensed to hexanol, etc.

The number of carbon atoms in the condensation products of the invention, letting $n$ equal the number of carbon atoms per molecule of original alcohol, can be represented by $2n-1$. Thus, the following reactions indicate the nature of the condensations effected according to this invention.

(1)

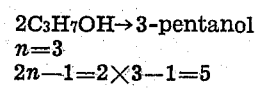

$n=3$ $2n-1=2\times3-1=5$

In other terms, 2 moles of reactant propanol condense to give a $C_5$ alcohol.

Likewise, 2 moles of ethanol ($n=2$) condense to give 2-propanol ($2n-1=2\times2-1=3$).

The alcohols with which this invention is primarily concerned are the normal or straight-chain 1-alkanols having from 2 to 10 carbon atoms per molecule. Branched-chain alkanols do not undergo the reaction of this invention by themselves. However, I have discovered that, in admixture with a normal 1-alkanol, a branched-chain alkanol undergoes cross-condensation or intercondensation with a normal 1-alkanol. For example, 2-methyl-1-propanol does not condense with itself, but, in admixture with 1-propanol, intercondenses with the 1-propanol to form 2-methyl-3-pentanol.

Furthermore, I have discovered that aromatic alcohols, such as benzyl alcohol, do not condense alone, but that, in admixture with 1-propanol, benzyl alcohol intercondenses to form 2-benzyl-1-propanol.

To recapitulate, then, the feed materials of this invention include (1) the normal 1-alkanols having from two to ten carbon atoms per molecule, (2) branched-chain alkanols of the same molecular weight range, and (3) aromatic alkanols of the type of benzyl alcohol and its homologues, such as 2-phenyl ethanol, etc., having from seven to ten carbon atoms per molecule. The second and the third types of alcohols are never used individually, but always in admixture with the first.

The contact material according to this invention is essentially calcium hydroxide and is preferably promoted with minor amounts of an alkali-metal hydroxide, such as sodium or potassium hydroxide, and silica. The proportion of alkali-metal hydroxide in the catalyst is from 0.2 to 30 weight per cent, preferably 0.5 to 10 per cent, and more preferably 0.5 to 5 per cent. The silica content is 0.1 to 5 per cent, preferably 0.2 to 2 per cent. Magnesium hydroxide may also be present, but it is preferred that the contact material contain not more than 20 per cent, and more preferably not more than 15 per cent of magnesium hydroxide. Commercial soda-lime is a very satisfactory contact material.

I have found that aliphatic alcohols, particularly the primary alcohols, can be condensed in the presence of soda-lime or soda-lime in admixture with copper oxide-chromium oxide as a contact material to form higher-boiling aliphatic alcohols, and, as a result of the presence of the soda-lime, an alcohol containing one less than twice the number of carbon atoms in the original or uncondensed alcohol is produced.

When soda-lime, not in admixture with copper oxide-chromium oxide, is employed as a contact material, the condensation reaction takes place in accordance with the equation (2) 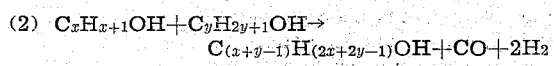
$$C_xH_{x+1}OH + C_yH_{2y+1}OH \rightarrow C_{(x+y-1)}H_{(2x+2y-1)}OH + CO + 2H_2$$

However, when a mixture of soda-lime and copper oxide-chromium oxide is employed, not only does reaction (2) take place, but, simultaneously therewith, a second condensation reaction takes place in accordance with the equation (3) 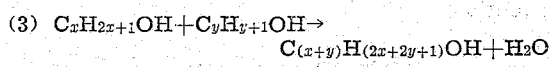
$$C_xH_{2x+1}OH + C_yH_{y+1}OH \rightarrow C_{(x+y)}H_{(2x+2y+1)}OH + H_2O$$

wherein the number of carbon atoms in the product alcohol is equal to the sum of the number of carbon atoms in the reactant alcohols. Thus, when propanol is condensed in the presence of soda-lime alone, the reaction proceeds in accordance with Equation 2, $x$ being equal to $y$, and a $C_5$ alcohol, viz diethyl carbinol is produced. However, when propanol is condensed in the presence of a mixture of soda-lime and copper oxide-chromium oxide ($x=y$), the reaction proceeds in accordance with Equations 2 and 3, and a $C_5$ and a $C_6$ alcohol, viz diethyl carbinal and 2-methylpentanol-1, are produced.

In Equations 2 and 3, $x$ and $y$ are preferably integers within the range of 2 to 10, but alcohols containing more than 10 carbon atoms per molecule are within the scope of the invention. Specific alcohols that may be employed in the process are ethanol, propanol, butanol, pentanol, hexanol, and higher alcohols and their corresponding isomers. Mixtures of propanol and butanol, butanol and pentanol, and propanol and hexanol may be condensed in accordance with the invention. These specific mixtures are merely illustrative of the various mixtures of alcohols that are within the scope of the invention.

The copper oxide-chromium oxide according to this invention can be prepared in any suitable manner. For example, a soluble copper salt, such as copper nitrate, can be added to an aqueous solution of ammonium dichromate. Ammonia is then added to precipitate copper ammonium chromate which is then separated, say, by filtration. The solid copper ammonium chromate is then ignited at a carefully controlled temperature of about 350° C. to effect the production of the desired copper oxide-chromium oxide. To prepare the catalyst containing copper oxide-chromium oxide for our process the resulting copper oxide-chromium oxide may be ground to a powder and then mechanically mixed with granular soda-lime. The mechanical mixture can be employed in the granular form or it can be pilled or pelleted by any of the well known methods. In the process the mixed catalyst contains copper oxide and chromium oxide in weight ratios within the range of 0.2:1 to 1:1, and the catalyst contains from 5 to 50 weight per cent of copper oxide-chromium oxide and from 50 to 95 weight per cent soda-lime.

The temperature at which the condensation reaction is effected is dependent upon the contact material employed. When employing soda-lime, not in admixture with copper oxide-chromium oxide, a temperature of at least 375° C. and preferably not above 580° C. is effective. Data in this specification show that, with this type of contact material, a temperature below 375° C., and particularly 350° C., produced little or no conversion. However, when soda-lime is employed in admixture with copper oxide-chromium oxide, temperatures as low as 300° C. produce satisfactory yields of high-boiling alcohols, but the higher temperatures within the range of 375° to 580° C. can also be used with this latter type of contact material, if desired. The effect of the copper oxide-chromium oxide is to enable the use of a lower temperature for the condensation reaction. The production of some alcohols containing twice the number of carbon atoms in the original alcohol, e. g. 2-methylpentanol-1 from normal propanol, takes place in the presence of a catalyst containing both soda-lime and copper oxide-chromium oxide.

At the temperatures disclosed above, the reactant alcohols are in the gaseous phase, and the condensation reaction is effected with the reactants in this phase. The gases of the reactant alcohols are contacted with a bed of one of the above-described contact materials at a charge rate within the range of 1 to 15, preferably 2 to 10, moles of reactant alcohol per kilogram of contact material per hour.

The condensation may be conducted at pressures of 0 to 1000 p. s. i., preferably 0 to 750 p. s. i. and more preferably 200 to 600 p. s. i.

The condensation reaction yields not only higher-boiling alcohols, but also reaction by-products, such as hydrogen, carbon dioxide, carbon monoxide, both saturated and unsaturated aldehydes and ketones, dialkyl ethers and esters. To simplify the separation of the alcohols from the reaction effluent, to improve the yield of the higher boiling alcohols, and to recover the maximum amount of uncondensed starting alcohols for reuse in the condensation reaction zone, the mixture of products from the condensation step is subjected to hydrogenation conditions, and the hydrogen from the condensation step is utilized for the hydrogenation reaction. A method of carrying out our overall process is set forth in detail subsequently.

The accompanying drawing is a schematic diagram showing two embodiments of this invention.

Referring now to Figure 1, an aliphatic alcohol, such as normal propanol, is introduced via line 1 to condensation zone 2 where the alcohol is contacted with one of the contact materials and at the conditions previously described. The reaction effluent containing product alcohols, aldehydes, ketones, hydrogen, and other reaction products is withdrawn via line 3 to compressor 4 where the effluent is compressed from atmospheric pressure to a pressure within the range of 25 to 1000 pounds per square inch. The compressed effluent is then passed via line 5 to hydrogenation zone 6 where the effluent is passed into contact with a hydrogenation catalyst, such as Raney nickel, metallic nickel on an inert support such as kieselguhr, copper oxide-chromium oxide, and the like at a temperature of 20° to 200° C. The effluent from zone 6 is withdrawn via line 7 into fractionator 8 where the effluent undergoes fractional distillation. Hydrogen is withdrawn from fractionator 8 and recycled via line 9 to compressor 4 for use in hydrogenation zone 6, and any hydrogen not required in zone 6 is withdrawn from the system via line 10. Water and light ends are withdrawn via line 11, and uncondensed starting alcohol is withdrawn from fractionator 8 and recycled to zone 2 via line 12. The high-boiling alcohols produced in the process are withdrawn via lines 13 and 14 and the fractionation residues or bottoms products are withdrawn via line 15.

The following specific examples are illustrative of this invention.

Example I 200 grams (3.3 moles) of normal propanol were passed through a Pyrex reaction tube, 16 inches long and one inch in diameter, containing a mixture of 30 grams of copper oxide-chromium oxide and 70 grams of soda-lime at 350° C., atmospheric pressure, and an hourly gaseous space velocity of 90 to 120. From the condensation step, 0.68 mole of hydrogen per mole of normal propanol was evolved, and the condensation reaction effluent was passed over a Raney nickel catalyst at 25° to 150° C. and at a pressure of 200 p. s. i. Reaction products from the hydrogenation step consumed 0.17 mole of hydrogen per mole of original normal propanol, and the resulting product was fractionally distilled to yield 11.4 per cent water, 40.8 per cent normal propanol, 7.1 per cent di-n-propyl ether, 14 per cent diethyl carbinol, 14 per cent 2-methylpentanol-1, and 12.7 per cent higher boiling residue.

Example II

The procedure disclosed in Example I was employed with soda-lime, containing no admixed copper oxide-chromium oxide, as a contact material. At a temperature of 350° C. no condensation of the normal propanol occurred. At a temperature of 400° C. the reaction product contained 30 per cent diethyl carbinol and no C₆ alcohols.

These experimental data show that at temperatures below 400° C. soda-lime, containing no copper oxide-chromium oxide, effects substantially no condensation of aliphatic alcohols, and, at temperatures of 400° C. and higher, this contact material effects a condensation of an alcohol to form a higher-boiling alcohol containing one less than twice the number of carbon atoms in the reactant alcohol. The data in Examples I and II show that, by the use of a mixture of copper oxide-chromium oxide and soda-lime, the condensation of alcohols can be effected at temperatures lower than those required when soda-lime containing no copper oxide-chromium oxide is employed.

Figure 2:
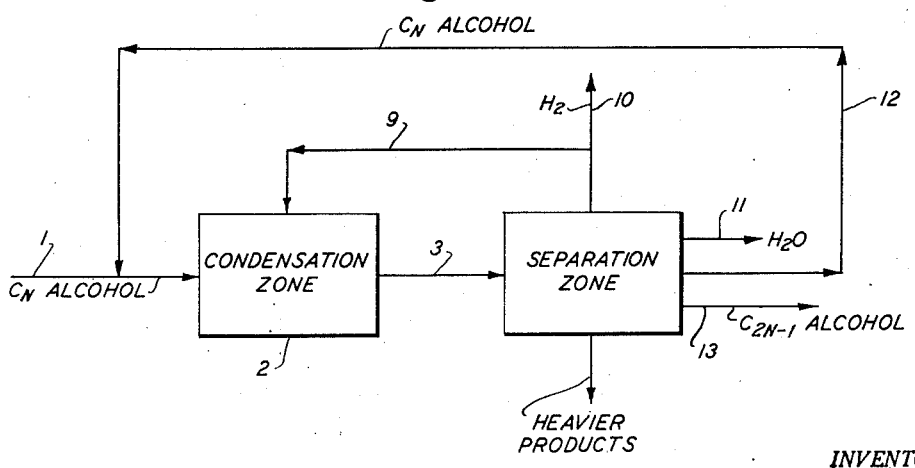

In the foregoing description of the drawing, I have disclosed the condensation of an alcohol followed by hydrogenation of resulting products with hydrogen produced in the condensation step to increase the yield of condensed alcohols. However, in a second embodiment of this invention, shown in Figure 2, the separate hydrogenation step is eliminated, and the effluent from the condensation step is passed directly to a separation zone, such as fractionation zone 8. In this embodiment, the condensation step is effected at a pressure above atmospheric and within the range of 25 to 1000, preferably 200 to 600 p. s. i., and the other reaction conditions in the condensation zone are similar to those described hereinabove. Ordinarily, the reaction is effected in the gaseous phase, but liquid phase and mixed gaseous and liquid phases may be employed. With a contact material of the type described hereinabove, hydrogenatable organic compounds, such as aldehydes and ketones, are produced during the condensation reaction, and, at the conditions employed in the second embodiment, at least a portion of the hydrogenatable compounds react with hydrogen from the condensation reaction to improve the yield of condensed alcohols.

It is a particular feature of this second embodiment that a hydrogenation reaction is effected in the condenstation zone without the addition of hydrogen from an outside source. As shown in Equation 2, hydrogen is produced during the condensation reaction when soda-lime is present in the catalyst, and this hydrogen is employed to effect the hydrogenation reaction. This second embodiment eliminates the hydrogenation zone, and hydrogen, obtained as an overhead from fractionation zone 8 may be recycled through conduit 9 to condensation zone 2 to facilitate the hydrogenation reaction.

The following example is illustrative of the second embodiment of this invention.

Example III 103.2 grams of soda-lime of 4- to 8-mesh size and containing 2 per cent moisture was placed in a steel reaction tube. Normal propanol was passed through the catalyst in the vapor phase at a charge rate of 7.07 moles of alcohol per kilogram of soda-lime per hour. The reaction temperature was 400° C., the reaction pressure was 600 p. s. i., and the reaction was continued for a period of 5.67 hours. From the reaction zone 0.687 mole of gaseous effluent per mole of propanol was evolved, and this gas contained 87.6 per cent hydrogen. The liquid reaction product was fractionally distilled to yield 2.37 per cent light ends, 4.85 per cent water, 61.0 per cent normal propanol, 23.2 per cent diethyl carbinol, 3.9 per cent 2-methyl pentanol-1 and 4.75 per cent higher-boiling residue.

The following example demonstrates the operability of my invention for the condensation of 1-octanol.

Example IV 1-octanol was passed over soda-lime at 400° C. and 600 p. s. i. at a rate of 2.8 moles per kilogram of soda-lime per hour. Gas evolution was 0.766 mole/mole octanol. The liquid recovery was 90.5 weight per cent. The liquid product was collected in two equal portions, and these were found to have substantially identical compositions, viz.:

| | Weight per cent |
|---|---|
| Water | 4.6 |
| Light ends | 3.4 |
| Octene | 1.7 |
| Octanol | 59.0 |
| 8-pentadecanol | 29.9 |
| Residue | 1.4 |

The 8-pentadecanol was a nearly white solid melting at 43° to 46° C. A portion was purified by recrystallization, and the melting point was determined to be 49° to 50° C. The literature value for the melting point of 8-pentadecanol is 49° to 50° C. As a further proof of identity, 1 gram was oxidized with dilute aqueous acidic potassium dichromate. There was obtained 0.5 gram of 8-pentadecanone, melting at 39° to 40° C. The literature value for the melting point of this ketone is 40° C.

In like manner, 1-pentanol is converted to a C9 alkanol.

*Example V*

At a reaction temperature of 400° C. and a pressure of 600 p. s. i. 1-propanol was contacted with ⅛-inch pellets of chemically pure calcium hydroxide. The charge rate was 9.4 moles of 1-propanol per hour per kilogram of calcium hydroxide. Gaseous products amounting to 0.51 mole per mole of 1-propanol charge were formed. The liquid product amounted to 61 weight per cent of the 1-propanol charged. The composition of the liquid product is shown in the following tabulation:

| | Weight per cent |
|---|---|
| Water | 1.9 |
| Light ends | 6.6 |
| 1-propanol | 59.3 |
| 3-pentanol (diethyl carbinol) | 15.8 |
| 2-methyl-1-pentanol | 9.2 |
| Residue | 7.2 |

Comparison of the data above with those in Example III show the promoting effect of the constituents of soda-lime other than calcium hydroxide. For example, when soda-lime was used, as in Example III, only 3.9 per cent of the liquid product was 2-methyl-pentanol-1 (C6), whereas, when chemically pure calcium hydroxide was used, as in the present example, the liquid product contained 9.2 per cent of 2-methyl-1-pentanol (C6). Also, the high-boiling residue formed in the present example amounted to 7.2 per cent of the liquid product whereas in Example III, where soda-lime was used, the high-boiling residue amounted to only 4.75 per cent of the liquid product.

*Example VI*

A mixture comprising 64 weight per cent benzyl alcohol and 36 weight per cent 1-propanol was contacted with soda-lime at 400° C. and 40 atmospheres at a charge rate of 5.5 moles of alcohol per kilogram of soda-lime per hour. A liquid product was obtained which amounted to 83 weight per cent of the alcohols charged. This liquid product had the following composition, in weight per cent:

| | |
|---|---|
| Water | 8.7 |
| Benzene | 4.3 |
| 1-propanol | 19.3 |
| 3-pentanol | 2.5 |
| 2-methyl-1-pentanol | 1.1 |
| Toluene | 4.8 |
| Benzyl alcohol | 21.6 |
| Benzaldehyde | 4.9 |
| 2-benzyl-1-propanol | 8.9 |
| Heavier | 23.9 |

An appreciable yield of 2-benzyl-1-propanol was formed by intercondensation. Benzyl alcohol alone fails to react under the same conditions.

*Example VII*

A mixture of 32 weight per cent 1-propanol and 68 weight per cent 1-octanol was contacted with soda-lime at 400° C. and 40 atmospheres at a charge rate of 3.3 moles per kilogram of soda-lime per hour. The product liquid amounted to 80 weight per cent of the charge and had the following composition, in weight per cent:

| | |
|---|---|
| Water | 1.8 |
| Light ends | 10.6 |
| Unreacted 1-propanol | 10.9 |
| 3-pentanol | 5.5 |
| 2-methyl-1-pentanol | 2.8 |
| Unreacted 1-octanol | 34.1 |
| 3-decanol | 14.6 |
| 8-pentadecanol | 17.4 |
| Heavier | 2.3 |
| | 100.0 |

The 3-decanol is believed to have been formed by the intercondensation of 1-propanol with 1-octanol according to Equation 2. The 3-pentanol is believed to have been formed by condensation of two moles of 1-propanol in accordance with Equation 1. The 8-pentadecanol is believed to have been formed by the condensation of two moles of 1-octanol in accordance with Equation 2.

*Example VIII*

A mixture of 45 weight per cent 1-propanol and 55 weight per cent 2-methyl-1-propanol was contacted with soda-lime at 400° C., 40 atmospheres, and a charge rate of 8.6 moles per kilogram soda-lime per hour. The product liquid amounted to 87 weight per cent of the charge and had the following composition, in weight per cent:

| | |
|---|---|
| Water | 2.9 |
| Light ends | 2.3 |
| Unreacted 1-propanol | 23.7 |
| Unreacted 2-methyl-1-propanol | 53.6 |
| 3-pentanol | 7.3 |
| 2-methyl-3-pentanol | 6.5 |
| Heavier | 3.7 |
| | 100.0 |

The 3-pentanol is believed to have been formed by the condensation of 1-propanol in accordance with Equation 1. The 2-methyl-3-pentanol is believed to have been formed by intercondensation of the 1-propanol with the 2-methyl-1-propanol in accordance with Equation 2. 2-methyl-1-propanol alone does not react under the same conditions.

*Example IX*

1-butanol was contacted with soda-lime at 400° C., 40 atmospheres, and a charge rate of 7.3 moles per kilogram soda-lime per hour. The chief product was 4-heptanol, which has one less than twice the number of carbon atoms per molecule that 1-butanol has.

*Example X*

1-propanol was contacted with soda-lime containing 19.4 per cent magnesia at 400° C., 40 atmospheres, and a charge rate of 7.3 moles per kilogram soda-lime per hour. The product liquid amounted to 87 weight per cent of the charge and had the following composition in weight per cent:

| | |
|---|---|
| Water | 4.6 |
| Light ends | 3.7 |
| Unreacted 1-propanol | 73.2 |
| 3-pentanol | 12.7 |
| 2-methyl-1-pentanol | 4.2 |
| Heavier | 1.6 |
| | 100.0 |

The magnesia had the effect of increasing the yield of 2-methyl-1-pentanol (C₆) according to Equation 3.

*Example XI*

A number of other oxides and several silicates were tested to determine whether they would promote the alcohol condensation reactions in accordance with the present invention. Materials tested for this purpose were magnesium oxide, chromic oxide, sodium silicate, calcium silicate, calcium borosilicate, calcium phosphatosilicate, thorium dioxide and copper-chromium oxide. The alcohol used in these tests was 1-propanol. In only one case, i. e., magnesia, was any 3-pentanol produced, and in this case the 3-pentanol amounted to only 2.3 weight per cent of the product liquid; 74.4 per cent of the product liquid was unreacted 1-propanol. These tests were conducted at approximately 400° C. and 600 p. s. i.

The soda-lime used in Examples I to IX was essentially calcium hydroxide containing 1.0 weight per cent magnesia, 0.7 weight per cent sodium hydroxide, 0.6 weight per cent silica, and 2.1 weight per cent water. That in Example X contained 19.4 weight per cent magnesia, 0.9 per cent sodium hydroxide, and 13.4 weight per cent water.

The term "contact material" as used herein is intended to cover both catalytic and reagent functions of the calcium hydroxide, since the function of the calcium hydroxide does not appear to be purely catalytic, but may also be that of a chemical reagent.

In copending application Serial Number 249,227, filed October 1, 1951, a process for the condensation of alkanols in the presence of calcium oxide is disclosed and claimed.

Reasonable variation and modification are possible within the scope of the foregoing disclosure and the claims to the invention, the essence of which is that a normal primary $C_2$ to $C_{10}$ alkanol is condensed, with itself or with an alcohol selected from the group consisting of branched-chain, primary alkanols having two to ten carbon atoms per molecule, and aromatic alcohols of the type of benzyl alcohol and its homologues having seven to ten carbon atoms per molecule, to obtain a higher alcohol containing a nonintegral multiple of the number of carbon atoms of the original alkanol by contacting with calcium hydroxide, preferably promoted with sodium hydroxide, at 375° to 580° C.; and that, by further promoting the calcium hydroxide with copper oxide-chromium oxide, the condensation may be conducted at temperatures as low as 300° C.

I claim:

1. A process for converting a lower molecular weight, normal, primary alkanol to a higher molecular weight alcohol in which the number of carbon atoms per molecule is a nonintegral multiple of the number of carbon atoms per molecule of the lower molecular weight alkanol, which process comprises contacting said alkanol with soda-lime at a temperature from 375° to 580° C. and a pressure from 0 to 1000 p. s. i.

2. A process for condensing two molecules of a normal 1-alkanol having $n$ carbon atoms per molecule to obtain a higher-boiling alcohol containing $2n-1$ carbon atoms per molecule, $n$ being an integer in the range 2 to 10, which process comprises contacting said alkanol, in the vapor phase, with soda-lime at a temperature from 375° to 580° C., a pressure from 0 to 1000 p. s. i., and a charge rate from 1 to 15 moles of alkanol per kilogram soda-lime per hour, and recovering said higher-boiling alcohol as a product of the process.

3. The process of claim 2 in which the soda-lime is calcium hydroxide containing 0.2 to 30 weight per cent of an alkali-metal hydroxide, 0.1 to 5 weight per cent silica, and not more than 20 weight per cent magnesium hydroxide.

4. The process of claim 3 in which the alkali-metal hydroxide is sodium hydroxide and the proportion thereof is from 0.5 to 10 weight per cent.

5. The process of claim 2 in which the normal 1-alkanol is 1-propanol, the higher-boiling alcohol is 3-pentanol, and the soda-lime is calcium hydroxide containing about 1 weight per cent magnesium hydroxide, 0.7 weight per cent sodium hydroxide, and 0.6 weight per cent silica.

6. The process of claim 2 in which the 1-alkanol is 1-octanol, the higher-boiling alcohol is 8-pentadecanol, the temperature is 400° C., and the pressure is 600 p. s. i.

7. A method for the condensation of a primary aliphatic alcohol which comprises contacting a normal primary aliphatic alcohol containing from two to ten carbon atoms per molecule with soda-lime in admixture with copper oxide-chromium oxide at a temperature within the range of 300° to 400° C., to produce, as one of the reaction products, an alcohol containing one less than twice the number of carbon atoms in said primary aliphatic alcohol.

8. The method which comprises contacting normal propanol with a contact material comprising soda-lime and copper oxide-chromium oxide as the essential ingredients at a temperature within the range of 300° to 400° C., passing the resulting effluent into contact with Raney nickel at a temperature within the range of 25° to 150° C. and a pressure within the range of 200 to 1000 pounds per square inch, separating hydrogen gas from the thus-produced effluent, passing at least a portion of the thus-separated hydrogen gas into contact with said Raney nickel along with the effluent from the first-named contacting step, and recovering diethyl carbinol and 2-methylpentanol-1 as products of the process.

9. A method for the condensation of a primary aliphatic alcohol which comprises contacting a primary aliphatic alcohol containing from two to ten carbon atoms per molecule with soda-lime at a temperature within the range of 400° to 580° C. at a pressure within the range of 200 to 1000 pounds per square inch to produce as a reaction product an alcohol containing one less than twice the number of carbon atoms in said primary aliphatic alcohol.

10. A process which comprises contacting a normal 1-alkanol having from 2 to 10 carbon atoms per molecule with a contact material comprising soda-lime at a temperature from 375° to 580° C. and a pressure from 200 to 1000 p. s. i. to produce a higher-boiling alcohol and hydrogen, recovering said higher-boiling alcohol, and recycling said hydrogen to the contacting step.

11. A process for converting a normal 1-alkanol to a higher molecular weight alcohol, which comprises contacting said alkanol, together with a second alkanol, with soda-lime at a temperature from 375° to 580° C. and a pressure of 200 to 1000 p. s. i. and recovering a product alcohol having a number of carbon atoms per molecule that is one less than the sum of the number of carbon atoms per molecule of the reactant alkanols.

12. The process of claim 11 in which said 1- alkanol has from 2 to 10 carbon atoms per molecule, and said second alkanol is a branched-chain alkanol having not more than 10 carbon atoms per molecule.

13. A process which comprises intercondensing a normal 1-alkanol having from 2 to 10 carbon atoms per molecule with another alcohol selected from the group consisting of 1-alkanols having 2 to 10 carbon atoms per molecule and benzyl alcohol and its homologues having 7 to 10 carbon atoms per molecule in the presence of soda-lime at a temperature from 375° to 580° C. and a pressure of 200 to 1000 p. s. i.

14. The process of claim 13 in which said normal 1-alkanol is 1-propanol, said other alcohol is benzyl alcohol, the temperature is 400° C., the pressure is 40 atmospheres, and 2-benzyl-1-propanol is recovered as a product of the process.

15. The process of claim 13 in which the normal 1-alkanol is 1-propanol, said other alcohol is 1-octanol, the temperature is 400° C., the pressure is 40 atmospheres, and 3-decanol is recovered as a product of the process.

16. The process of claim 13 in which said normal 1-alkanol is 1-propanol, said other alcohol is 2-methyl-1-propanol, the temperature is 400° C., the pressure is 40 atmospheres, and 2-methyl-3-pentanol is recovered as a product of the process.

17. A process which comprises contacting normal propanol with a contact material comprising calcium hydroxide at a temperature in the range 375 to 580° C., a pressure in the range of 0 to 1000 p. s. i., and a charge rate in the range 1 to 15 mols of propanol per kilogram of contact mass per hour and recovering 3-pentanol as a product of the process.

EDWARD E. BURGOYNE.

References Cited in the file of this patent

UNITED STATES PATENTS

| Number | Name | Date |
|---|---|---|
| 1,910,582 | Wibaut | May 23, 1933 |
| 1,992,480 | Fuchs et al. | Feb. 26, 1935 |
| 2,593,009 | Clark et al. | Apr. 15, 1952 |

FOREIGN PATENTS

| Number | Country | Date |
|---|---|---|
| 282,448 | Great Britain | Mar. 19, 1929 |
| 335,631 | Great Britain | Oct. 2, 1930 |